United States Patent [19]

Vohrer

[11] 4,098,298

[45] Jul. 4, 1978

[54] HOSE

[76] Inventor: Herbert Vohrer, Hattsteiner Strasse 22, D-6243 Falkenstein, Fed. Rep. of Germany

[21] Appl. No.: 645,442

[22] Filed: Dec. 30, 1975

Related U.S. Application Data

[63] Continuation of Ser. No. 424,703, Dec. 14, 1973, abandoned.

[51] Int. Cl.² .......................................... F16L 11/08
[52] U.S. Cl. .................................. 138/122; 138/132; 138/133; 138/129
[58] Field of Search ............... 138/129, 121, 122, 132, 138/133, 134, 173, 174; 156/143, 144

[56] References Cited

U.S. PATENT DOCUMENTS

| 1,005,134 | 10/1911 | Balliett | 138/132 |
| 2,330,651 | 9/1943 | Welger | 138/133 |
| 2,448,485 | 8/1948 | Chernack | 138/133 |
| 2,558,763 | 7/1951 | Lee | 138/131 X |
| 3,076,737 | 2/1963 | Roberts | 138/121 X |
| 3,137,319 | 6/1964 | St. John et al. | 138/132 |
| 3,210,234 | 10/1965 | Baskin et al. | 138/133 X |

FOREIGN PATENT DOCUMENTS

| 1,499,956 | 9/1967 | France | 138/133 |
| 743,743 | 1/1956 | United Kingdom | 138/122 |
| 904,741 | 8/1962 | United Kingdom | 138/122 |

Primary Examiner—Richard E. Aegerter
Assistant Examiner—James E. Bryant, III
Attorney, Agent, or Firm—Cooper, Dunham, Clark, Griffin & Moran

[57] ABSTRACT

Flexible reinforced pressure and suction hose of the type in which a wire helix is sandwiched between inner and outer wall members including a strip of relatively hard material disposed between the wall members and wound intermediate the turns of the helix and spaced therefrom for forming a helical cavity between the wall members containing the helix and permitting movement of the helix therein. A stranded reinforcing layer may also be included between the wall members.

7 Claims, 8 Drawing Figures

HOSE

This is a continuation, of application Ser. No. 424,703 filed Dec. 14, 1973 now abandoned.

The invention relates to a hose having an internal wall consisting of an inner hose, over which is wound a wire helix, over which is disposed an external hose. The invention is also concerned with a process for the manufacture of such a hose.

The uses to which the hoses according to the invention can be applied with particular success are those where especially flexibility and a smoothest possible inside wall and light weight are important, as for example suction cleaner hoses, shower hoses, etc.

With all prior known constructional forms, the flexibility of the hose depends on the pliability of the hose wall in the region of the bar between the turns of the helix, i.e. with the bending of the hose, there is formed in the compression zone a fold which is forced into the interior of the hose. Naturally, the structure of the wall is made corrugated, because thereby the fold formation is assisted. Nevertheless, it has to be expected that the said bar between the turns of the helix is in certain circumstances forced through outwardly on bending, whereby the regularity of the fold formation becomes lost and the visual impression suffers. As an example of such a hose, reference is made to German Auslegeschrift No. 1,221,003.

In order to prevent this forcing through effect, cords have also been placed in the troughs of the corrugations, which cords in turn have a negative influence on the flexibility of the hose (German Pat. No. 1,046,869).

Furthermore, a hose made of synthetic plastics material is known from Gebrauchsmuster No. 6,937,013, in which the inside wall consists of an extruded inner hose, on which lie axial reinforcing filaments, over which a helix is coiled. The outside of the hose also consists of an extruded external hose, but this latter hose is in practice to be considered as a tube, because cylindrical body having non-elastic elements inlaid in axial parallel relation does not without additional measures have a flexible behaviour. The testing of a corresponding model or specimen has shown this.

With the known hoses, it is imperative that the supporting helix with the hose wall are connected to one another by adhesive bonding or by welding, or that the helix is well embedded in the wall or is connected to it. It is only in this way that the necessary pliability for forcing a fold between the turns of the helix in an inward direction is obtained with the known hoses. The described method of forming the fold has in addition the disadvantage that the wall of the hose is not kept smooth.

It is here that the invention becomes operative, which has for its object to propose a hose which is characterised by having high flexibility and a low weight.

This is achieved according to the invention by the fact that a strip of relatively hard material is wound between the wire helix and parallel to it, the inner hose, strip and outer hose being connected to one another, while a pocket or cavity is formed between the turns of the strip and in which the helix is able to move freely.

Differing from the known hoses, the flexibility is obtained according to the invention by the smooth inner hose being able to yield in the region of the bending towards the inside of the hose, because it does not at this point have any rigid connection with the outer hose or the wire helix. The same also applies as regards the outer hose, which is able to yield outwardly in the same region. However, the strip prevents the folds or creases between the turns of the helix, which are recognized as being disadvantageous. The strip therefore has to be made of a material which is such that it is practically incapable of being compressed with the bending, but maintains its union with the inner hose and the outer hose. This strip is given such a width that these otherwise usual folds or creases caused by movement between the turns of the helix can no longer be developed. On the other hand, however, there must be sufficient spacing from the helix, so that the inner hose beneath the helix forms a fold or crease on bending. Consequently, with the bending of the hose, the helix is moved freely into the cavity between the inner and outer hoses.

The said components, namely, the inner hoses, outer hose and strip, are bonded with one another by heating or by adhesive bonding. With the movement of the hose, the said fold or crease is formed in the compression zone inwardly and outwardly above and below the helix.

In addition, reinforcing elements of flexible material can be provided at the said periphery of the hose so as to extend substantially axially. Such reinforcing elements are for example produced from textile yarns or from PVC strips reinforced with textile threads.

two possibilities exist as regards the arrangement of these reinforcing elements: in one case, the reinforcing elements can be applied directly to the outside of the inner wall. With a straight hose, the reinforcing elements are thus seated on the same radius.

With another preferred constructional form, the reinforcing elements ae guided in undulatory form over the wire helix and beneath the strips of relatively hard material.

The invention is hereinafter more fully explained by reference to constructional examples, from which further important features will become apparent. In the drawing.

Figure 1:
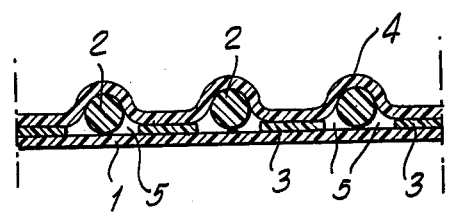
FIG. 1 is a longitudinal section through a piece of a first constructional form of a hose according to the invention, not using reinforcing elements.

In FIG. 1, a smooth inner hose 1 of softened polyvinyl chloride, hereinafter referred to as PVC, is provided, on which is laid a wire helix 2 consisting of metal or a hard synthetic plastics material.

Wound between the turns of the wire helix 2 is a ribbon 3 consisting of hard PVC. Depending on the thickness of the hard PVC ribbon, this structure is covered in more or less corrugated form or even directly with a soft PVC layer 4.

In this connection, the expert will so design the forming cavity as regards size that, on the one hand, the strength under pressure and reduced pressure is guaranteed and, on the other hand, with the bending of the hose, it is possible for small folds causing the flexibility to form in the compression zone. The regulation of these properties and also of the smoothness of the external wall are achieved by appropriate choice of the width, thickness and hardness of the transverse strip. Such a choice can readily be made by an expert, on the basis of his expert knowledge.

All PVC components, i.e. the inner hose, the helically wound ribbon of hard PVC and the outer hose, are united with one another by methods as known per se, for example, welded or adhesively bonded.

It is of decisive importance that the supporting helix 2 consists of materials, as for example polyamide, polyolefins, etc., which do not form any union with these materials when using measures which serve for the uniting of the PVC components with one another. The ribbon 3 consisting of hard PVC has, for example, a thickness of about 0.5 mm. It is to lie exactly in the middle between the turns of the helix and is to be sufficiently wide that at those positions where an inwardly extending bending fold or crease is developed with the prior known hoses, this is prevented by the stiffening of the hard ribbon. On the other hand, this ribbon is not to extend close to the supporting helix, so that a pocket or cavity 5 can be developed around the helix, in which the said helix is able to move freely.

Figure 4:
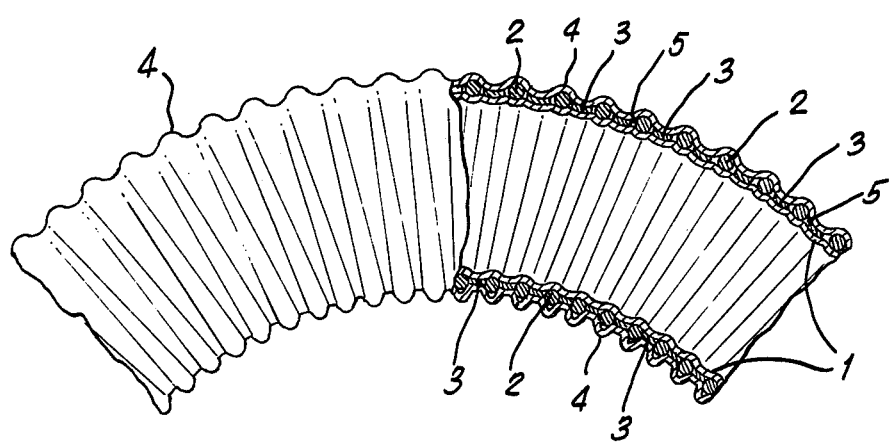
FIG. 4 is a view, partly in section, of a curved hose of the constructional form according to FIG. 1.

With the bending of the hose, a crease or fold is then developed according to the invention in the compression zone above the helix and in the compression zone beneath the helix, in the manner which is also shown in FIG. 4. As a consequence, the hose has extraordinary flexibility. This improved flexibility arises from the fact that it is not the entire hose wall which has to be bent inwardly for achieving the bending effect, but only the bottom half, while the remaining part lying above the helix is curved outwardly. An additional advantage of the novel hose is the complete smoothness of the internal wall in the stretched state.

With such hoses, it is often desirable that these hoses are reinforced with textiles against pressure, more especially at relatively high tempertures or with strong stressing, such as often occurs with similar hoses, for example with suction cleaner hoses. This is, for example, already described in the two publications already referred to. In accordance with the invention, such reinforcing elements of yarns are also embedded, but because of the novel structure of the hose, these elements or yarns are able completely to fulfil their function as reinforcing elements, without having any negative influence on the pliability of the hose.

Figure 2:
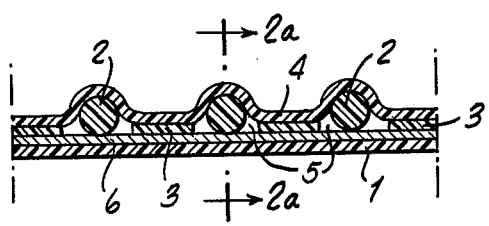
FIG. 2 is a section corresponding to FIG. 1, in which additional reinforcing elements are provided directly on the inner hose.

Such constructional forms are shown in FIGS. 2, 2a, 3 and 3a. In FIG. 2, the textile reinforcing elements 6, which can for example also be made in strip form, are laid directly on the outside of the inner hose 1, and are connected in the region of the strips 3 to the inner hose and to the outer hose.

Figure 2A:
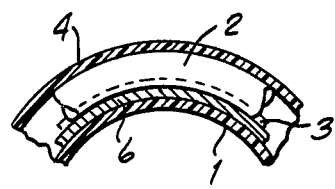
FIG. 2a is a partial cross-section through the hose according to FIG. 2.
Figure 3:
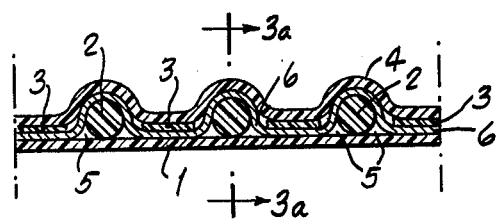
FIG. 3 is a similar section through a third constructional form, the reinforcing elements being arranged in undulatory or corrugated form.
Figure 3A:
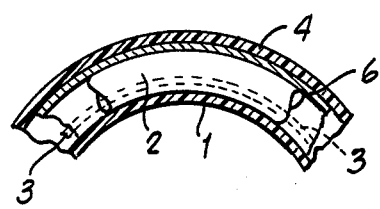
FIG. 3a is a cross-section through a part of the hose according to FIG. 3.

The constructional form which is shown in FIG. 3a differs from the form according to FIG. 2a, in that the reinforcing elements 6 are laid therein in corrugated form above the wire helix 2 and below the ribbons 3.

The use of ribbons made of PVC, according to German Pat. No. 1,629,830, reinforced with textile threads, has proved to be particularly effective as material for these reinforcing elements 6. Combined therewith is the advantage that the PVC ribbons can readily be united with the other PVC components of the hose, so that the threads or ribbons appear as a closed layer in the hose wall.

Figure 5:
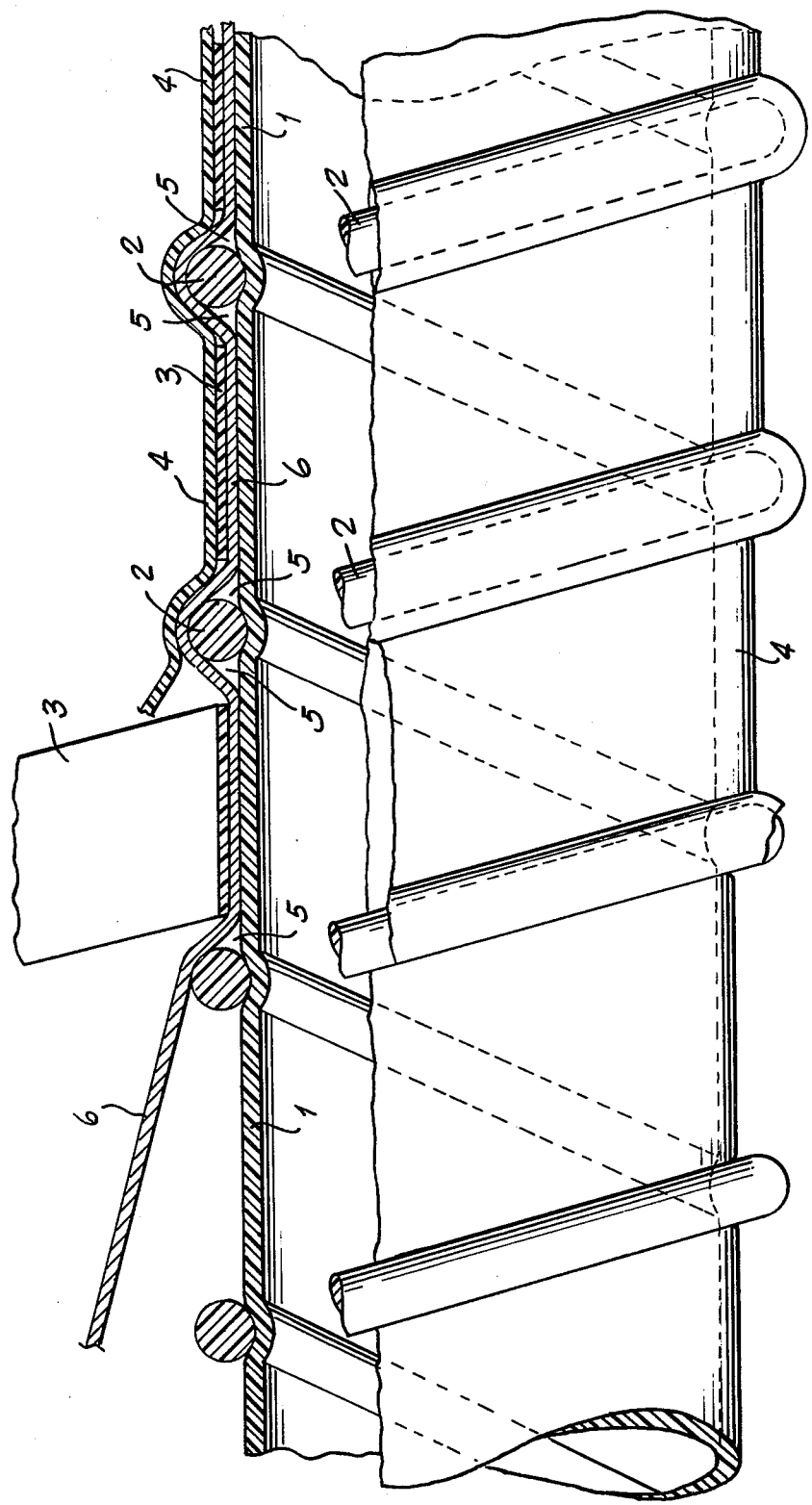
FIG. 5 is a view, partly in section, of a hose according to FIG. 3, for explaining the separate processing steps in the manufacture of this hose.
Figure 6:
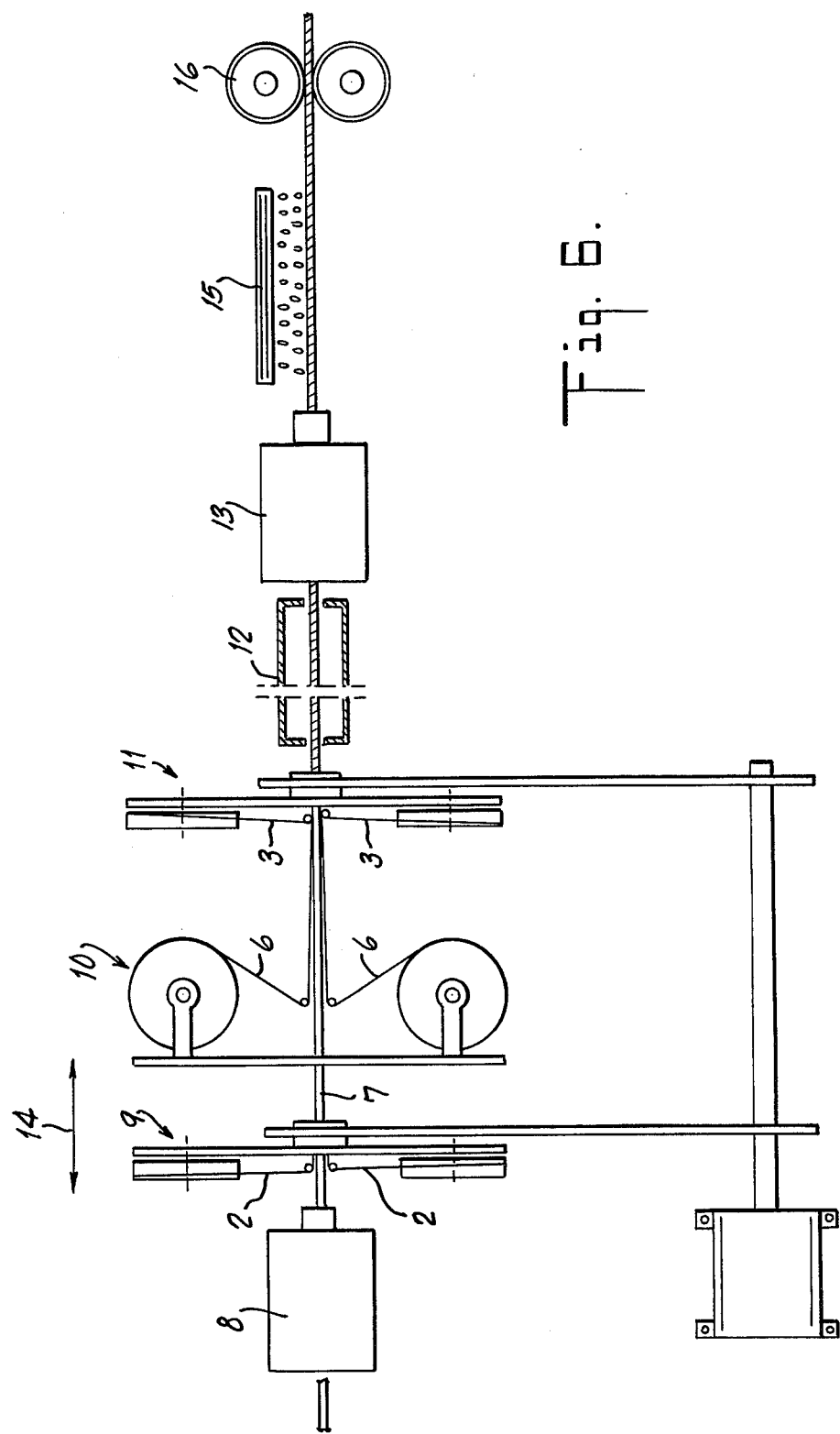
FIG. 6 shows diagrammatically an elevation of an installation for manufacturing the hose which is shown in FIG. 5.

A process for the manufature of such hoses is hereinafter explained by reference to FIGS. 5 and 6. Provided for this purpose is a rigid or flexible mandrel 7. A PVC layer with a thickness of 0.5 mm is injected in a transverse injection head 8 of an extruder, the said layer providing the inner hose 1. Thereafter, at a winding station 9, there is carried out the helical coiling of the inner hose with a polyamide wire, over which is caused to run a PVC ribbon according to Offenlegungsschrift No. 1,629,830 in a following supply station 10. The ribbons 6 are drawn in by means of the hard PVC strip 3 in corrugated form between the turns of the helix. This hard PVC strip 3 is wound on at a winding station 11.

The assembly passes through a heating duct 12, which is for example equipped with infra-red radiators, and ends in a second transverse injection head 13 of a second extruder, where the outer layer is applied.

If the reinforcing elements 6 are to be arranged in axially parallel form, they can be caused to run on either in the first transverse injection head 8 or immediately following the latter on to the surface of the inner hose, the said elements being united with the still tacky hose material.

Arranged following the transverse injection head 13 is also a cooling zone 15 and a pair of extractor rolls 16 for the finished hose.

The individual spacings, more particularly between winding station 9 and transverse injection head 8, can be adjusted, as indicated by the arrow 14, so that the inner hose 1 is already hardened when the helix 2 is wound on.

A hose which is maufactured in the manner described is very light. Its weight is only half that of a conventionally extruded PVC hose. It is extraordinarily flexible and resistant to buckling, this in fact being caused by the novel incorporation of bending elements into the hose. It is suitable for being used as, for example, a sprinkler or shower hose, suction cleaner hose, etc.

It is obvious that the hose as described, for which PVC has been chosen as the material, can also be made from other thermoplasts or also from elastomers, provided that the processing steps as described can be suitably carried out.

Moreover, the mandrel 7 is not absolutely necessary; it is possible instead also to maintain an internal pressure in the interior of the inner hose 1, until the synthetic plastics material leaving the transverse injection head 8 is sufficiently cured.

I claim:

1. In a reinforced pressure and suction hose of the type having a flexible inner hose wall, a flexible outer hose wall and a wire helix disposed between said walls, the improvement comprising strip means, of a relatively hard and stiff material as compared to that of said hose walls, said strip means being bonded to and disposed between said hose walls intermediately within the space between the turns of the wire helix, for forming a helical cavity between said hose walls containing said helix unbonded therein, and said strip means being of a width and thickness so as to be spaced from the turns of said helix to permit movement of the unbonded helix in said cavity and to prevent bending and folding of the inner and outer hose walls except at the cavity.

2. Hose according to claim 1 wherein the inner hose wall and the outer hose wall are of a material selected from the group consisting of thermoplastic materials, and elastomers.

3. Hose according to claim 1 further comprising a plurality of reinforcing elements of flexible material disposed between said hose walls and passing between said strip means and said inner hose wall.

4. Hose according to claim 3 wherein the reinforcing elements are applied directly to the outside of the inner wall.

5. Hose according to claim 3 wherein said reinforcing elements are further passed between said helix and said outer hose wall.

6. Hose according to claim 1 wherein the inner and outer hose walls and the strip means are all of PVC.

7. Hose according to claim 6 wherein said wire helix is of a material selected from the group consisting of metals, polyamides, and polyolefins.

* * * * *